United States Patent
Moro

(10) Patent No.: US 8,627,031 B2
(45) Date of Patent: Jan. 7, 2014

(54) SEMICONDUCTOR MEMORY DEVICE AND METHOD OF READING DATA FROM AND WRITING DATA INTO A PLURALITY OF STORAGE UNITS

(75) Inventor: Hiroyuki Moro, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 209 days.

(21) Appl. No.: 13/167,609

(22) Filed: Jun. 23, 2011

(65) Prior Publication Data
US 2012/0005414 A1  Jan. 5, 2012

(30) Foreign Application Priority Data
Jun. 30, 2010  (JP) ................................ 2010-150340

(51) Int. Cl.
*G06F 12/00* (2006.01)
(52) U.S. Cl.
USPC ........... 711/163; 711/103; 711/154; 711/167; 711/168; 711/169; 711/E12.001; 711/E12.008
(58) Field of Classification Search
USPC .......... 711/103, 154, 163, 167–169, E12.001, 711/E12.008
See application file for complete search history.

(56) References Cited

U.S. PATENT DOCUMENTS

| 6,563,734 | B2 | 5/2003 | Taki |
| 7,490,192 | B2 * | 2/2009 | Sugimoto et al. ............. 711/103 |
| 2002/0024088 | A1 | 2/2002 | Taki |
| 2009/0172345 | A1 * | 7/2009 | Allen et al. .................... 711/208 |

FOREIGN PATENT DOCUMENTS

| JP | 07-254292 A | 10/1995 |
| JP | 07-281952 | 10/1995 |
| JP | 2002-073407 A | 3/2002 |

OTHER PUBLICATIONS

Notice of Reasons for Rejection for Japanese Patent No. 2010-150340 Mailed Oct. 25, 2011.
Information Sheet for preparing an Information Disclosure Statement, Toshiba (English Abstract for JP 3699890).

* cited by examiner

*Primary Examiner* — Jasmine Song
(74) *Attorney, Agent, or Firm* — Knobbe Martens Olson & Bear LLP

(57) ABSTRACT

According to one embodiment, a semiconductor memory device includes a command processing module, a plurality of storage units, a plurality of control modules, an adjustment circuit, and a setting register. The adjustment circuit is configured to exclude the control module connected to the storage unit of a second group from a write operation in accordance with identification data, and to cause the control module connected to the storage unit of the second group to perform a read operation in a period overlapping the write operation performed by the control module connected to the storage unit of a first group.

4 Claims, 5 Drawing Sheets

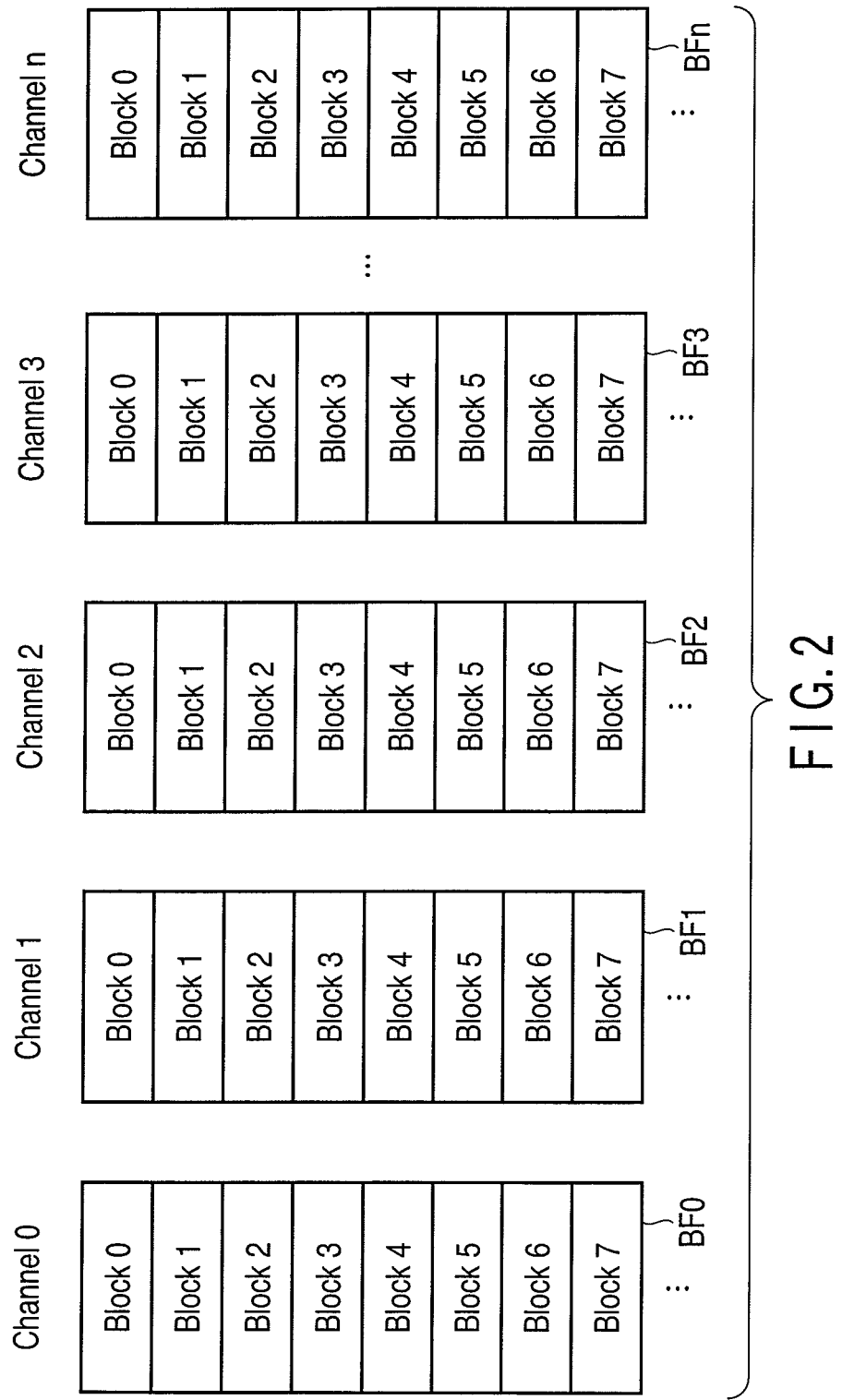
F I G. 2

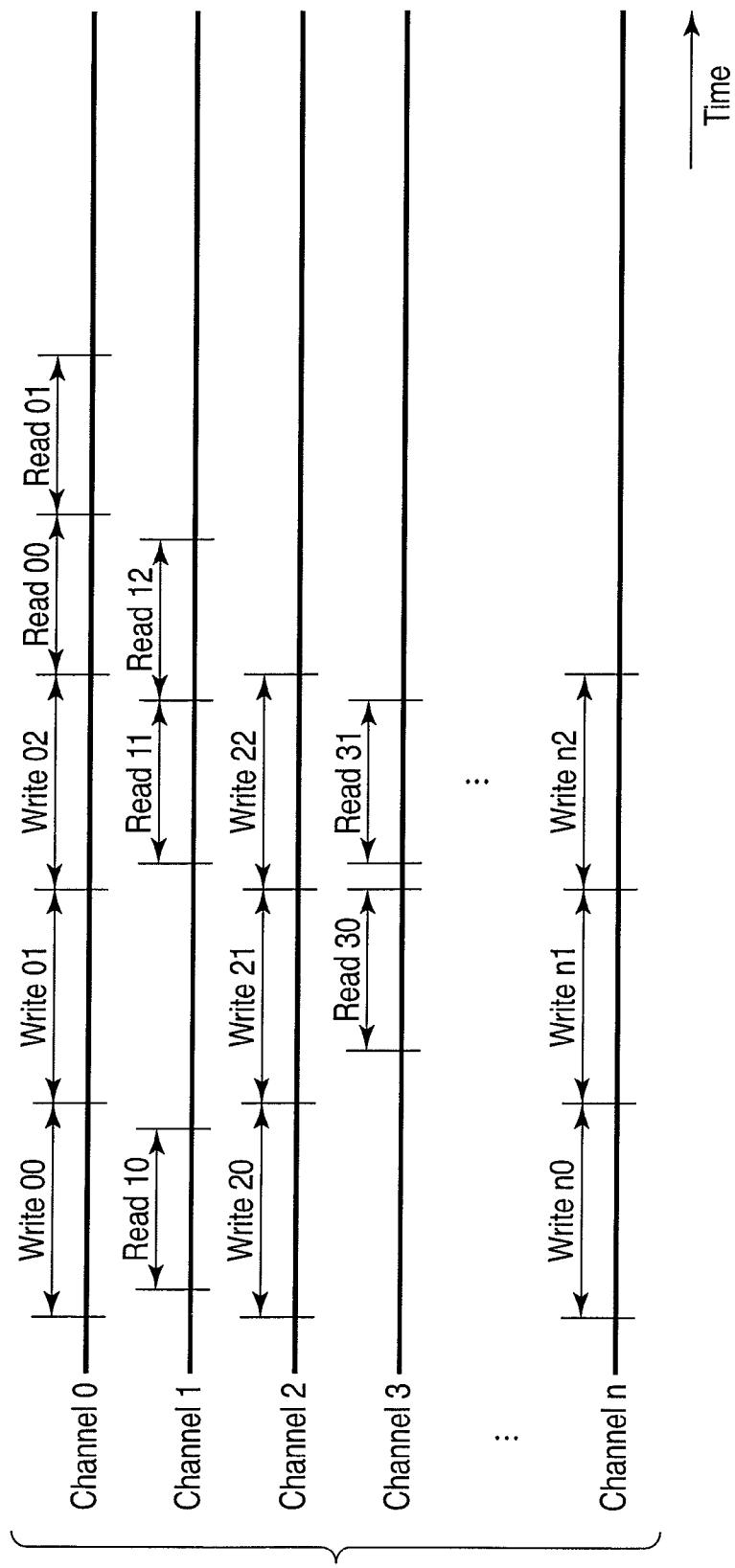
F I G. 5

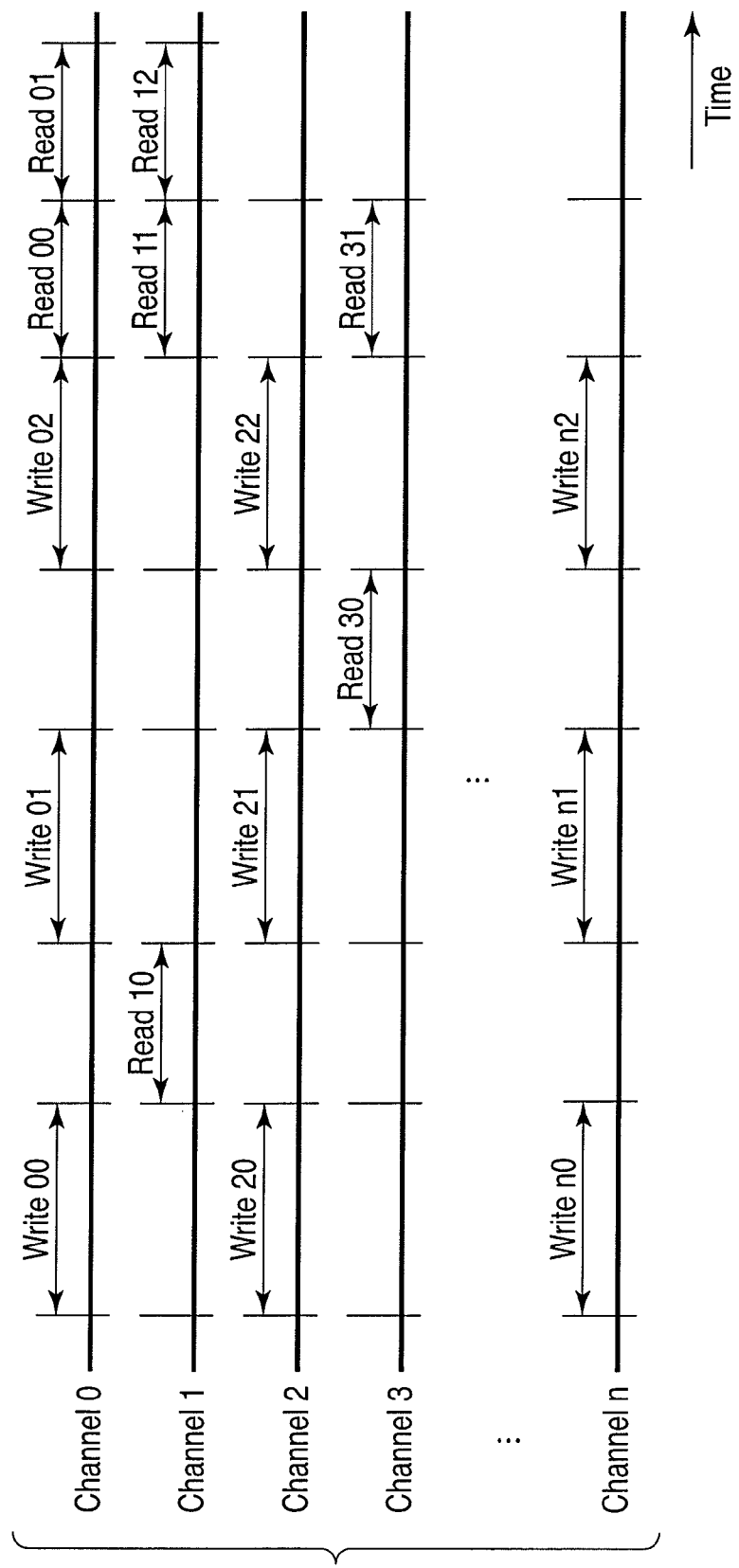
F I G. 6

SEMICONDUCTOR MEMORY DEVICE AND METHOD OF READING DATA FROM AND WRITING DATA INTO A PLURALITY OF STORAGE UNITS

CROSS-REFERENCE TO RELATED APPLICATIONS

This application is based upon and claims the benefit of priority from Japanese Patent Application No. 2010-150340, filed Jun. 30, 2010; the entire contents of which are incorporated herein by reference.

FIELD

Embodiments described herein relate generally to a semiconductor memory device and a data read and write method.

BACKGROUND

Various types of semiconductor memory devices are generally used. One type is a solid-state drive (SSD). The SSD has a plurality of NAND flash memories. NAND flash memories are nonvolatile memories, each capable of storing a great amount of data at high density. They are memory devices expected to be used in place of the hard disk drive.

Data can indeed be read from each NAND flash memory provided in the SSD. In some cases, however, data must be written into all NAND flash memories. This is why data is read from the SSD during a period, and is written into the SSD during another period not overlapping the first-mentioned period.

Since data cannot be read and written from and into the SSD in any overlapping periods, more time is spent to write and read data than otherwise. A demand is therefore made for a technique that can write and read at high efficiency.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary diagram illustrating the concept of channels provided in the SSD;

FIG. 5 is an exemplary timing chart schematically explaining read operation and write operation at the SSD; and FIG. 6 is another exemplary timing chart schematically explaining read operation and write operation at a comparative example of the SSD.

DETAILED DESCRIPTION

Various embodiments will be described hereinafter with reference to the accompanying drawings. In general, according to one embodiment, there is provided a semiconductor memory device comprising a command processing module configured to process data in accordance with a data read request and a data write request which are externally input, and to output processed data, a plurality of storage units, a plurality of control modules connected, in one-to-one relation, to the storage units and configured to perform a read operation and a write operation with reference to the storage units, an adjustment circuit connected between the command processing module and the control modules and configured to cause the control modules to perform the read operation and the write operation in accordance with the processed data obtained at the command processing module, and a setting register connected to the adjustment circuit and configured to hold identification data identifying whether each of the storage units belongs to a first group for which the write operation is permitted, or to a second group for which the write operation is prohibited. The adjustment circuit is configured to exclude the control module connected to the storage unit of the second group from the write operation in accordance with identification data, and to cause the control module connected to the storage unit of the second group to perform the read operation in a period overlapping the write operation performed by the control module connected to the storage unit of the first group.

According to another embodiment, there is provided a method of reading data from and writing data into a plurality of storage units, comprising processing data in accordance with a data read request and a data write request, and outputting processed data, and performing a read operation and a write operation with reference to the storage units in accordance with the processed data. The performing the read and write operations comprising identifying whether each of the storage units belongs to a first group for which a write operation is permitted or to a second group for which the write operation is prohibited, excluding the storage unit of the second group from the write operation in accordance with identification data, and causing the storage unit of the second group to perform the read operation in a period overlapping the write operation performed for the storage unit of the first group.

Figure 1:
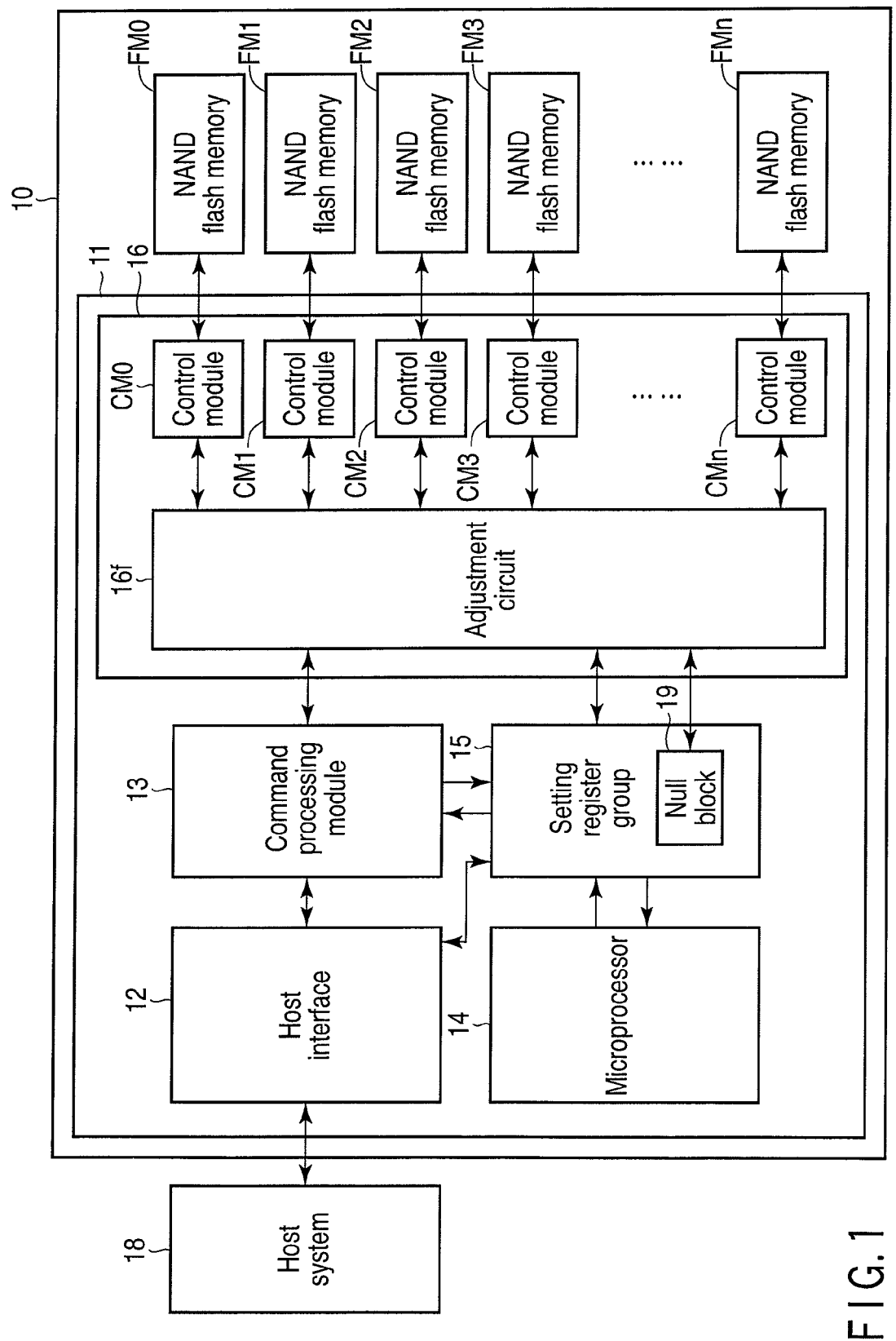
FIG. 1 is an exemplary block diagram showing a solid state drive (SSD) according to an embodiment.

One embodiment will be described with reference to the drawings appended hereto. The embodiment discloses a semiconductor memory device and a data read and write method. More specifically, the semiconductor memory device according to this embodiment is a solid state drive (SSD), which is used as a semiconductor drive. FIG. 1 is a block diagram showing the SSD.

As shown in FIG. 1, the SSD 10 comprises a plurality of flash memories FM0 to FMn and an SSD controller 11. Flash memories FM0 to FMn are NAND type memories used as storage units. In this embodiment, n is a natural number equal to or greater than 4. Flash memories FM0 to FMn are nonvolatile memories produced by using semiconductor. Flash memories FM0 to FMn are connected to the SSD controller 11.

The SSD controller 11 comprises a host interface 12, a command processing module 13, a microprocessor 14, a setting register group 15 such as a setting register, and a control unit 16. The host interface 12 is connected to a host system 18 of an outside. The control unit 16 is connected to flash memories FM0 to FMn.

The control unit 16 comprises control modules CM0 to CMn and an adjustment circuit 16f. Control modules CM0 to CMn are connected to flash memories FM0 to FMn, in one-to-one relation. Control modules CM0 to CMn hold a program which is concerned with operation of read, write, delete, etc. Using this program, control modules CM0 to CMn control flash memories FM0 to FMn, respectively. Thus, control modules CM0 to CMn can perform a read operation and a write operation to flash memories FM0 to FMn, respectively.

The command processing module 13 processes data in accordance with a data read request and a data write request input from the host system 18 (exterior) through the host interface 12. The command processing module 13 outputs processed data.

The adjustment circuit 16f is connected between the command processing module 13 and control modules CM0 to CMn. The adjustment circuit 16f adjusts the time control modules CM0 to CMn control flash memories FM0 to FMn, by using the above-mentioned program. Hence, the adjustment circuit 16f can cause control modules CM0 to CMn to perform the read operation and the write operation, in accordance with the processed data obtained at the command processing module 13.

The host interface 12, command processing module 13, setting register group 15 and control unit 16 are connected to the system bus (not shown) of the microprocessor 14.

The setting register group 15 is connected to the adjustment circuit 16f. The microprocessor 14 outputs values, which are set in the setting register group 15. The setting register group 15 is configured to hold identification data, identifying whether each of flash memories FM0 to FMn belongs to a first group for which the write operation is permitted, or to a second group for which the write operation is prohibited.

Therefore, the setting register group 15 may have a Null block 19 as shown in FIG. 1. The Null block 19 can inform the adjustment circuit 16f which control modules are connected to the flash memories that have Null blocks 19. The adjustment circuit 16f is configured to uses the data of the Null block 19, to exclude control module connected to flash memory having the Null block, from the write operation, and can cause control module connected to flash memory having the Null block, only to perform the read operation.

The adjustment circuit 16f can exclude every control module connected to every flash memory of the second group from the write operation, in accordance with the data (i.e., data in the Null block 19) stored in the setting register group 15. The adjustment circuit 16f can cause control module connected to flash memory of the second group, to perform the read operation in a period overlapping the write operation performed by control module connected to flash memory of the first group.

FIG. 2 is an exemplary diagram illustrating the concept of channels. As seen from FIG. 1 and FIG. 2, the control modules and the flash memories are combined in one-to-one relation, constituting channels 0 to n. More precisely, channel 0 is a combination of control module CM0 and flash memory FM0; channel 1 is the combination of control module CM1 and flash memory FM1; channel 2 is the combination of control module CM2 and flash memory FM2; channel 3 is the combination of control module CM3 and flash memory FM3. Thus, channel n is the combination of control module CMn and flash memory FMn.

FIG. 2 shows exemplary block configurations BF0 to BFn associated with flash memories FM0 to FMn of channels 0 to n, respectively. The block of the block configurations BF0 to BFn is data units, each of which can be deleted atone deleting action.

Figure 3:
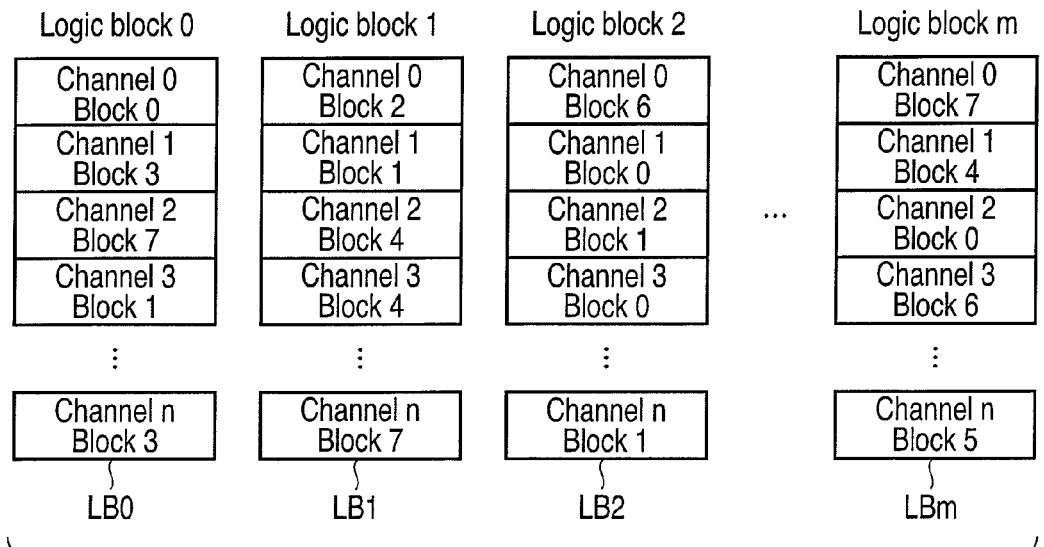
FIG. 3 is an exemplary diagram illustrating the concept of logic blocks provided in the SSD.

FIG. 3 is an exemplary diagram illustrating the concept of logic blocks. As seen from FIGS. 1 to 3, each of logic blocks LB0 to LBm is constituted by n+1 blocks selected from channels 0 to n, respectively. In this embodiment, m is a natural number equal to or greater than 4.

More specifically, logic block 0_LB0, is constituted by block 0 of channel 0, block 3 of channel 1, block 7 of channel 2, block 1 of channel 3, . . . , and block 3 of channel n. Logic block 1_LB1, is constituted by block 2 of channel 0, block 1 of channel 1, block 4 of channel 2, block 4 of channel 3, . . . , and block 7 of channel n.

Logic block 2_LB2, is constituted by block 6 of channel 0, block 0 of channel 1, block 1 of channel 2, block 0 of channel 3, . . . , and block 1 of channel n.

Similarly, logic block m_LBm, is constituted by block 7 of channel 0, block 4 of channel 1, block 0 of channel 2, block 6 of channel 3, . . . , and block 5 of channel n.

Figure 4:
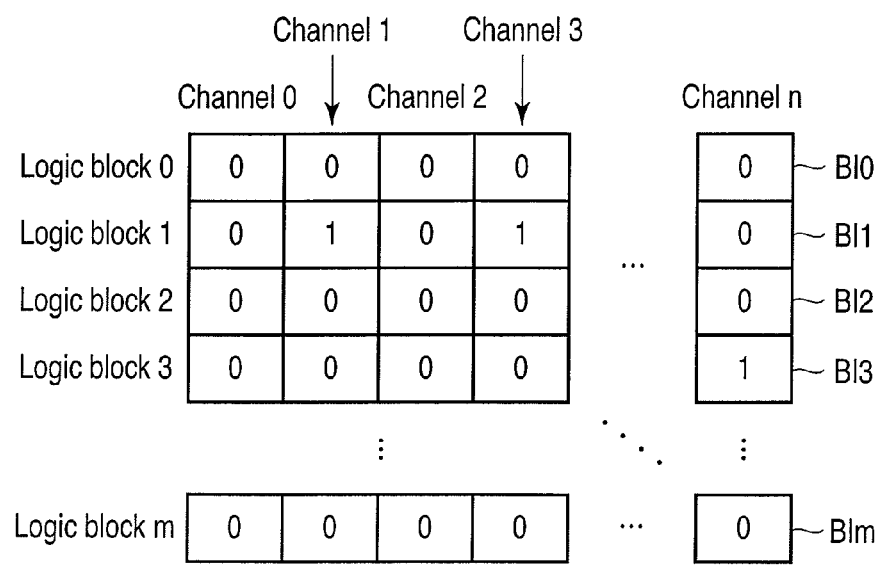
FIG. 4 is an exemplary diagram illustrating the concept of the Null block provided in setting register group of the SSD.

FIG. 4 is an exemplary diagram illustrating the concept of the Null block provided in setting register group 15. The setting register group 15 has a logic block each, in which an identification data is set. The Null block 19 is a flag that indicates any one of logic blocks LB0 to LBm that cannot be write because of its fatigue (that is, cannot be accessed to be write). Logic blocks 0 to m_LB0 to LBm are those selected from channels 0 to n, respectively. Any logic block only needs to have information as to which channel has the Null block.

Therefore, logic blocks 0 to m_LB0 to LBm only need to have as many flags as the channels. Assume that each flag is "0" indicating that the channel does not have the Null block, or "1" indicating that the channel has the Null block. Then, Null block information BI0 of logic block 0, Null block information BI2 of logic block 2, and Null block information BIm of logic block m indicate that all blocks constituting the logic block are all valid. In other words, these information items shows that control modules CM0 to CMn for all respective channels are not excluded from the write operation.

Null block information BI1 of logic block 1 indicates that channels 1 and 3 are invalid. In other words, this information BI1 shows that control modules CM1 and CM3 for channels 1 and 3, respectively, are excluded from the write operation. Similarly, Null block information BI3 of logic block 3 indicates that channel n is invalid. In other words, this information BI3 shows that control module CMn for channel n is excluded from the write operation.

The SSD 10 is configured as described above.

A method of reading data from and writing data into a plurality of the storage units by the SSD 10 will be explained. In this method, the adjustment circuit 16f excludes control modules CM1 and CM3 connected to flash memories FM1 and FM3 belonging to the second group, from the write operation, in accordance with Null block information BI1 of logic block 1. Further, the command processing module 13 processes data in accordance with a data read request and a data write request in such a specific order as will be described below.

(1) Data write request
(2) Data write request
(3) Data read request to channel 3
(4) Data write request
(5) Data read request to Channel 0
(6) Data read request to Channel 0
(7) Data read request to Channel 1
(8) Data read request to Channel 3
(9) Data read request to Channel 1

The data read request (4) is received after the write operation starts in response to the data write request (3). The data read request (6) is received after the write operation starts in response to the data write request (5).

FIG. 5 is an exemplary timing chart schematically explaining read operation and write operation at the SSD 10. As shown in FIG. 5, read operation and write operation are allocate on the time axis. Of "Write A B" shown in FIG. 5, "A" is the number of the channel in which data should be written, and "B" is the number of times data has been written in the channel. Of "Read C D" shown in FIG. 5, "C" is the number of the channel in which data should be read, and "D" is the number of times data has been read in the channel.

As seen from FIG. 1 and FIG. 5, first, Write 0 0, Write 2 0 and Write n 0 are performed in response to the data write request (1). At this point, the adjustment circuit 16f detects that channels 1 and 3 are invalidated, from the information about the Null block 19 (i.e., Null block information BI1). The adjustment circuit 16f therefore determines that channels 1 and 3 may be allocated to read operation.

Then, the adjustment circuit 16f excludes channels 1 and 3 from object for the writing, and allows the read operation to control modules CM1 and CM3. Thus, the read operation can be performed in channels 1 and 3 even while the data write request (1) is being executed. That is, the response to the data read request (2) is paralleled with the response to the data write request (1) in parallel. Thus, Read 1 0 can be completed while Write 0 0, Write 2 0 and Write n 0 are being performed. The write operation which complied with the data write request (3) is performed in three channels (i.e., Write 0 1, Write 2 1 and Write n 1).

Read 3 0, i.e., process performed in response to the data read request (4) issued after the write operation has started in response to the data write request (3), is performed in channel 3 excluded from the write operation. Therefore, Read can be completed while Write 0 1, Write 2 1 and Write n 1 are being performed.

Next, Write 0 2, Write 2 2 and Write n 2 are performed in response to the data write request (5). While these write processes are being performed, Read 1 1, i.e., process performed in response to the data read request (8), and Read 3 1, i.e., process performed in response to the data read request (9) can be performed in parallel. The other processes are performed in response to the data read requests (6), (7) and (10), when any channels are available for read operation.

A method of reading data from and writing data into a plurality of the storage units at a comparative example of the SSD 10 will be explained. In the comparative method, too, the adjustment circuit 16f excludes control modules CM1 and CM3 connected to flash memories FM1 and FM3 belonging to the second group, from the write operation, in accordance with Null block information BI1 of logic block 1. However, the adjustment circuit 16f does not cause control modules CM1 and CM3 to perform the read operation in a period overlapping the write operation performed by control modules CM0, CM2 and CMn.

FIG. 6 is another exemplary timing chart schematically explaining read operation and write operation at a comparative example of the SSD 10. As shown in FIG. 6, read operation and write operation are allocate on the time axis. As seen from FIG. 6, data is read during a period, and is written during another period not overlapping the first-mentioned period. Consequently, data cannot be written and read as efficiently as in the comparative example of the SSD 10.

As described above, the SSD 10 has the command processing module 13, flash memories FM0 to FMn, control modules CM0 to CMn, adjustment circuit 16f and setting register group 15. In the method of reading data and writing data into the SSD 10 so configured, the adjustment circuit 16f excludes the control module connected to the flash memory of the second group, from the write operation, in accordance with the identification data of the setting register group 15. The adjustment circuit 16f can cause the control module connected to the flash memory of the second group to perform the read operation in a period overlapping the write operation performed by the control module connected to the flash memory of the first group.

Thus, data can be read in a period overlapping the period other data is being written. This increases the efficiency of writing and reading data in the SSD 10. The overall performance of the SSD 10 can therefore be enhanced.

Hence, an SSD and a data writing/reading method can be provided, which excel in efficiency of writing and reading data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the SSD 10 may not incorporate the host interface 12 and the microprocessor 14. In such a case, host interface 12 and the microprocessor 14 are provided outside the SSD 10.

Further, flash memories FM0 to FMn may be either integrated altogether or formed independent of one another. Similarly, control modules CM0 to CMn may be either integrated altogether or formed independent of one another.

If data is read while other data is being written, the period of reading data may overlap the period of writing data, only a little.

Moreover, the setting register group 15 may hold data other than the above-mentioned identification data. For example, the setting register group 15 may hold various blocks (various data items) other than the Null block 19.

The semiconductor memory device according to the invention is not limited to the SSD 10 described above. Various changes and modifications can be made to provide semiconductor memory devices of various types.

What is claimed is:

1. A semiconductor memory device comprising:
a command processor configured to process data in accordance with a data read request and a data write request, and to output processed data;
a plurality of storage units;
a plurality of controllers connected and corresponding to the plurality of storage units and configured to execute a read operation and a write operation with reference to the storage units;
an adjustment module connected between the command processor and the controllers and configured to cause the controllers to execute the read operation and the write operation in accordance with the processed data from the command processor; and
a setting register connected to the adjustment module and configured to hold identification data identifying whether each storage unit belongs to a first group for which the write operation is permitted, or to a second group for which the write operation is prohibited,
wherein, when the processed data in accordance with the data write request is outputted from the command processor, the adjustment module is configured to exclude the controller connected to the storage unit of the second group from the write operation in accordance with the identification data, and to cause the controller connected to the storage unit of the second group to execute the read operation in a period while the write operation is executed by the controller connected to the storage unit of the first group.

2. The semiconductor memory device of claim 1, wherein the plurality of storage units are flash memories.

3. The semiconductor memory device of claim 1, wherein the setting register comprises a logic block comprising the identification data.

4. A method of reading data from and writing data into a plurality of storage units, comprising:
- processing data in accordance with a data read request and a data write request, and outputting processed data; and
- executing a read operation and a write operation with reference to the plurality of storage units in accordance with the processed data;
- the executing the read and write operations comprising:
  - identifying whether each storage unit belongs to a first group for which a write operation is permitted or to a second group for which the write operation is prohibited;
  - excluding the storage unit of the second group from the write operation in accordance with identification data; and
  - causing the storage unit of the second group to execute the read operation in a period while the write operation is executed for the storage unit of the first group.

* * * * *